(12) United States Patent
Yoo et al.

(10) Patent No.: US 8,527,901 B2
(45) Date of Patent: Sep. 3, 2013

(54) RECORDING MEDIUM HAVING A DATA STRUCTURE FOR MANAGING GRAPHIC INFORMATION AND RECORDING AND REPRODUCING METHODS AND APPARATUSES

(75) Inventors: Jea Yong Yoo, Seoul (KR); Kang Soo Seo, Anyang-si (KR); Byung Jin Kim, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 686 days.

(21) Appl. No.: 10/920,174

(22) Filed: Aug. 18, 2004

(65) Prior Publication Data
US 2005/0141878 A1  Jun. 30, 2005

(30) Foreign Application Priority Data
Dec. 26, 2003 (KR) .................. 10-2003-0097529

(51) Int. Cl.
G06F 3/048 (2006.01)
(52) U.S. Cl.
USPC ........... 715/810; 715/716; 715/720; 715/721; 715/756; 715/813; 715/814
(58) Field of Classification Search
USPC .......... 715/810, 813–814, 756, 716, 720–721
See application file for complete search history.

(56) References Cited

U.S. PATENT DOCUMENTS

| | | | |
|---|---|---|---|
| 5,701,385 A * | 12/1997 | Katsuyama et al. .......... 386/106 |
| 6,009,234 A | 12/1999 | Taira et al. | |
| 6,088,507 A | 7/2000 | Yamauchi et al. | |
| 6,250,928 B1 | 6/2001 | Poggio et al. | |
| 6,286,001 B1 | 9/2001 | Walker et al. | |
| 6,392,664 B1 | 5/2002 | White et al. | |
| 6,424,793 B1 | 7/2002 | Setogawa et al. | |
| 6,757,906 B1 * | 6/2004 | Look et al. .................. 725/45 |
| 6,766,101 B1 | 7/2004 | Yamada | |
| 6,847,777 B1 | 1/2005 | Nakamura | |
| 6,879,769 B1 * | 4/2005 | Kawai et al. ............... 386/240 |
| 6,999,674 B1 | 2/2006 | Hamada et al. | |
| 7,113,694 B2 * | 9/2006 | Kim et al. .................. 386/95 |
| 7,236,687 B2 | 6/2007 | Kato et al. | |
| 7,237,252 B2 * | 6/2007 | Billmaier .................. 725/43 |
| 7,260,782 B2 * | 8/2007 | Wallace et al. ............. 715/716 |

(Continued)

FOREIGN PATENT DOCUMENTS

| | | |
|---|---|---|
| CN | 1254162 | 5/2000 |
| CN | 1264894 | 8/2000 |

(Continued)

OTHER PUBLICATIONS

Office Action dated Dec. 5, 2007 by the Taiwanese Patent Office for counterpart Taiwan Invention Patent Application No. 093129504.

(Continued)

*Primary Examiner* — Doon Chow
*Assistant Examiner* — Anil Kumar
(74) *Attorney, Agent, or Firm* — Harness, Dickey & Pierce, P.L.C.

(57) ABSTRACT

In the data structure for managing reproduction of graphic information, graphic information and an indicator associated with the graphic information is stored on the recording medium. The indicator indicates whether the graphic information is for display in response to user request.

10 Claims, 11 Drawing Sheets

(56) References Cited

U.S. PATENT DOCUMENTS

| | | | |
|---|---|---|---|
| 7,454,714 B2 * | 11/2008 | Totman et al. | 715/841 |
| 7,509,581 B1 * | 3/2009 | Song et al. | 715/721 |
| 7,548,565 B2 * | 6/2009 | Sull et al. | 370/503 |
| 7,743,329 B2 * | 6/2010 | Rahman et al. | 715/716 |
| 2001/0010757 A1 | 8/2001 | Mori et al. | |
| 2001/0014894 A1 * | 8/2001 | Han et al. | 707/202 |
| 2002/0104096 A1 | 8/2002 | Cramer et al. | |
| 2002/0135607 A1 | 9/2002 | Kato et al. | |
| 2002/0174430 A1 | 11/2002 | Ellis et al. | |
| 2003/0028892 A1 | 2/2003 | Gewickey et al. | |
| 2003/0147629 A1 | 8/2003 | Kikuchi et al. | |
| 2003/0161615 A1 | 8/2003 | Tsumagari et al. | |
| 2004/0047591 A1 | 3/2004 | Seo et al. | |
| 2004/0070628 A1 * | 4/2004 | Iten et al. | 345/810 |
| 2007/0133948 A1 | 6/2007 | Kikuchi et al. | |

FOREIGN PATENT DOCUMENTS

| | | |
|---|---|---|
| CN | 1272210 | 11/2000 |
| EP | 0724264 | 7/1996 |
| EP | 0 357 407 B1 | 3/1997 |
| EP | 0788106 | 8/1997 |
| EP | 0 624 876 B1 | 1/1999 |
| EP | 1 103 974 | 5/2001 |
| EP | 1 198 133 | 4/2002 |
| EP | 1 223 580 A2 | 7/2002 |
| EP | 0 913 822 | 3/2003 |
| EP | 1 465 047 A1 | 10/2004 |
| EP | 1 005 043 | 8/2005 |
| EP | 1 115 119 | 5/2006 |
| JP | 2000-152141 | 5/2000 |
| JP | 2000-333126 | 11/2000 |
| JP | 2001-126451 | 5/2001 |
| JP | 2001-251565 | 9/2001 |
| JP | 2001-312880 | 11/2001 |
| JP | 2003-123389 | 4/2003 |
| JP | 2003-230104 | 8/2003 |
| JP | 2003-249057 | 9/2003 |
| JP | 2003-264787 | 9/2003 |
| JP | 2005-511981 | 2/2005 |
| JP | 2007-515025 | 6/2007 |
| JP | 4485532 | 6/2010 |
| RU | 2180470 | 3/2002 |
| RU | 2233011 | 7/2004 |
| TW | 449737 | 8/2001 |
| TW | 501131 | 9/2002 |
| TW | 545072 | 8/2003 |
| WO | WO 97/07504 | 2/1997 |
| WO | WO 97/37491 | 10/1997 |
| WO | WO 00/36600 | 6/2000 |
| WO | WO 01/35409 | 5/2001 |
| WO | WO 01/45102 | 6/2001 |
| WO | WO 03/085972 | 10/2003 |
| WO | WO 2004/028157 A1 | 4/2004 |
| WO | WO 2005/036546 | 4/2005 |
| WO | WO 2005/048261 | 5/2005 |
| WO | WO 2005/048592 | 5/2005 |

OTHER PUBLICATIONS

Taiwanese Office Action corresponding to Taiwanese Application No. 093129502 dated Dec. 31, 2008.
European Office Action dated May 15, 2009.
PCT International Search Report and Written Opinion dated Apr. 5, 2005.
Japanese Office Action dated May 22, 2009 with English translation.
Russian Office Action dated Jun. 22, 2009 with English translation.
Office Action for corresponding Russian Application No. 2006116879/28 (018356) dated Oct. 29, 2009.
Search Report for corresponding European Applicaiton No. 04 774 353.9 dated Dec. 16, 2009.
Russian Notice of Allowance dated Sep. 17, 2009 with English translation.
United States Office Action dated Oct. 14, 2009.
Notice of Allowance for counterpart Japanese Patent Application No. 2006-546802 dated Mar. 16, 2010 with English translation.
English language Abstract for Japanese Patent Application No. 2006-522391 dated Sep. 28, 2006.
Office Action by Japanese Patent Office dated Jun. 25, 2010 for Applicaiton No. 2006-546801 (without translation).
Office Action for corresponding Japanese patent application No. 2010-035955 dated Sep. 27, 2011.
Office Action for corresponding U.S. Appl. No. 11/606,275 dated Nov. 9, 2011.
Notice of Allowance for Japanese patent application No. 2006-546801 mailed on Aug. 19, 2011 (with English translation).
U.S. Office Action dated Nov. 25, 2011 for U.S. Appl. No. 11/606,281.
Notice on the Third Office Action for Chinese patent application No. 200480032681.4 dated Apr. 26, 2011 with English translation.
Malaysian Examination Report for corresponding Malaysian patent application No. PI 20043442 dated Nov. 15, 2011 (in English).
Office Action for corresponding Taiwanese patent applicaiton No. 096143 908 dated Feb. 20, 2012 with English translation.
Notice on the Third Office Action for corresponding Chinese patent application No. 200480032785.5 dated Sep. 5, 2012 with English translation.
International Search Report dated Sep. 16, 2005.

* cited by examiner

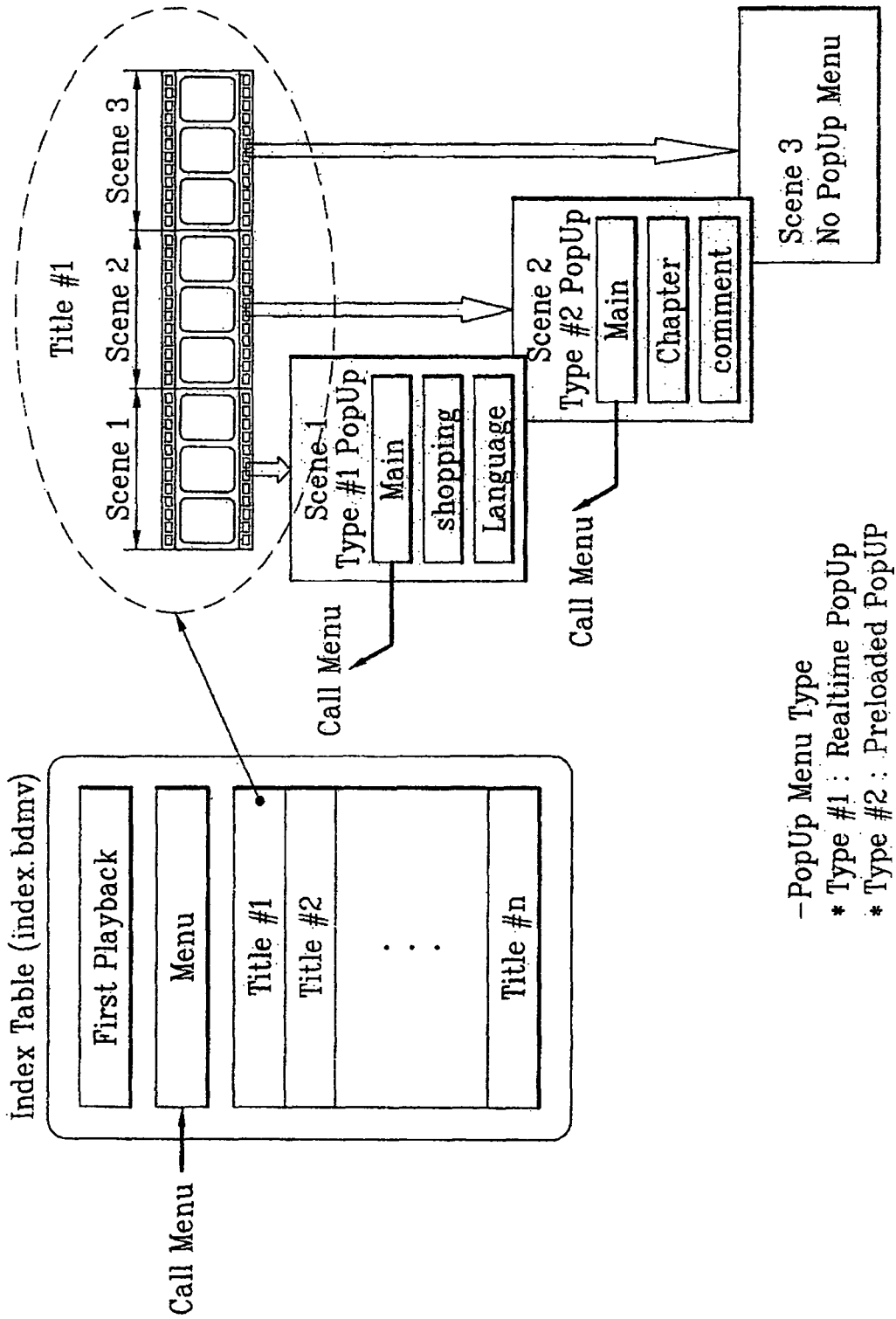

RECORDING MEDIUM HAVING A DATA STRUCTURE FOR MANAGING GRAPHIC INFORMATION AND RECORDING AND REPRODUCING METHODS AND APPARATUSES

CROSS-REFERENCE TO RELATED APPLICATIONS

This application claims the benefit of the Korean Application No. 10-2003-0097529 filed on Dec. 26, 2003 which is hereby incorporated by reference in its entirety.

BACKGROUND OF THE INVENTION

1. Field of the Invention

The present invention relates to high density recording media such as read-only blu-ray discs (BD-ROM) and methods and apparatuses associated therewith.

2. Discussion of Related Art

Generally, an optical disk on which a large capacity of data is recordable is widely used as an optical record medium. Recently, many efforts have been made to develop a new high density optical record medium (HD-DVD) on which video data of high definition and audio data of high quality can be recorded and stored, such as a blu-ray disk (hereinafter abbreviated BD) and the like.

The blu-ray disk (BD) as a next generation HD-DVD technology is the next generation optical record solution enabling storage of data that remarkably surpasses previous DVD. The technology specifications of global standards for the BD are being established together with other digital equipment standards.

Although many efforts have been made to develop optical reproducing players adopting the BD specifications, there are many difficulties in developing a complete optical reproducing player since the BD specifications have not been fully established yet.

Particularly, for effective reproduction of data from the Blu-ray Disc (BD), menu information must be organized and provided so that through interaction with the user, selective data reproduction may take place. However, in the present Blu-ray Disc (BD) standards, because consolidated standards of the supplementary data, particularly the menu information are not complete yet, there are many restrictions on the development of a Blu-ray Disc (BD) optical reproducing apparatus, which causes problems with reproducing the menu information and providing it to the user according to a request of the user.

SUMMARY OF THE INVENTION

A recording medium according to the present invention includes a data structure for managing reproduction of graphic information.

In one embodiment, the recording medium stores graphic information and an indicator associated with the graphic information. The indicator indicates whether the graphic information is for display in response to user request. For example, the graphic information may be menu information.

In another embodiment, the recording medium stores graphic information and an indicator associated with the graphic information, and the indicator indicates whether the graphic information is for always on display. For example, the graphic information may be menu information.

In one embodiment, the indicator indicates whether the graphic information is for display in response to user request or for always on display.

In an embodiment, the recording area stores the graphic information multiplexed with main data. For example, the graphic information may be for always on display.

In another embodiment, the recording area stores the graphic information in a clip file separate from a clip file storing main data. For example, the graphic information may be for always on display or may be for display in response to user request.

Embodiments of the present invention also provide for the recording medium to store a playitem or a subplayitem providing navigation information for reproducing the graphic information.

The present invention further provides apparatuses and methods for recording and reproducing the data structure according to the present invention.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 3A to 3B illustrate a data structure of the recording medium (e.g., BD-ROM) for managing graphic information and a method for managing the menu information in accordance with an embodiment of the present invention;

DETAILED DESCRIPTION OF THE INVENTION

Reference will now be made in detail to the embodiments of the present invention, examples of which are illustrated in the accompanying drawings. Wherever possible, the same reference numbers will be used throughout the drawings to refer to the same or like parts. While terms used in the present invention are possibly selected from currently well-known terms, terms are arbitrarily chosen by the applicant in some cases and their meanings are explained in detail in the following description. Hence, the present invention should be understood with the meanings of the corresponding terms chosen by the applicant instead of the simple names of the terms.

Figure 1:
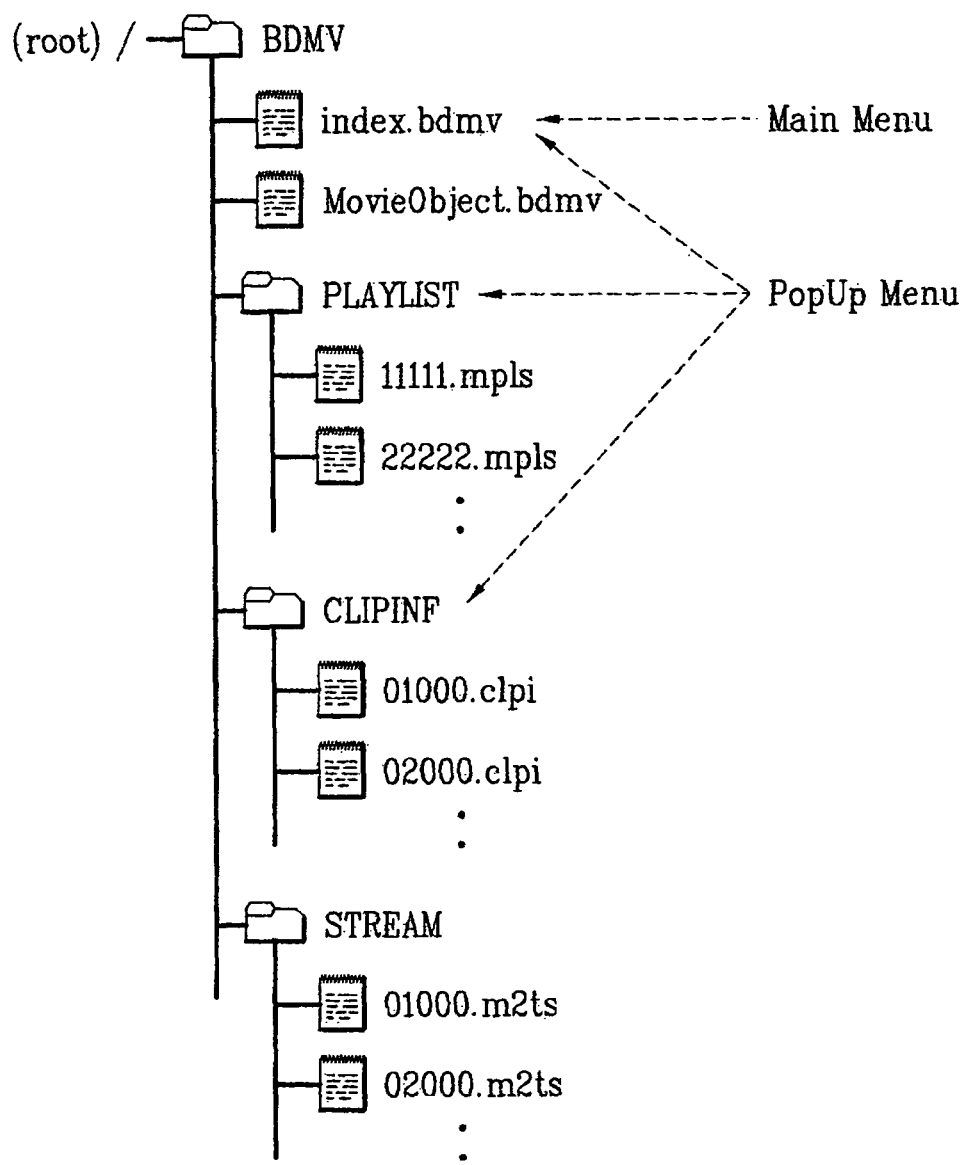
FIG. 1 illustrates a file structure of a high density optical disc in accordance with one embodiment of the present invention.

First of all, the file structure and recording medium format for data playback management adopted by the present invention are explained in detail by referring to FIG. 1 and FIG. 2 below. FIG. 1 illustrates a file structure of a high density optical disc in accordance with one embodiment of the present invention. As shown, the file structure includes at least one BD directory BDMV under a root directory. In the BD directory BDMV, an index file index.bdmv and an object file MovieObject.bdmv are included as general file (upper file) information. Moreover, three directories, which have playback management and navigation information for the data recorded on the recording medium (e.g., a Blu-ray Disc) are recorded in the BD directory BDMV. The three directories are a playlist directory PLAYLIST, a clip information directory CLIPINF, and a stream directory STREAM. The three directories and the files included therein will be explained in detail below.

Files for video and audio streams, which are called an 'AV stream', are recorded according to specific formats in the stream directory STREAM. For instance, '*.m2ts' is used as each extension name of AV stream files (e.g., 01000.m2ts and 02000.m2ts) since the AV stream files are generally recorded as MPEG2 transport packets. In the BD specification, the AV stream is named a clip stream file. Relating to the present invention, the data recorded in the disk will exist in the form of the AV stream file.

The clipinfo directory CLIPINF consists of clipinfo files 0.1000.clpi and 02000.clpi having a one-to-one correspondence with the AV stream files (*.m2ts), respectively. Specifically, attribute information and timing information of an AV stream are recorded in the corresponding clipinfo file (*.clpi). The timing information includes information on mapping a presentation time stamp (PTS) of data in the AV stream file to a source packet number of a source packet in the AV stream file. Typically this map is referred to as an entry point map. In the BD standard, the AV stream file *.m2ts and the corresponding clipinfo file *.clpi are collectively called a "clip". Accordingly, the file "01000.clpi" in the clipinfo directory CLIPINF has attribute information and timing information on the file "01000.m2ts" in the stream directory, and the files "01000.clpi" and "01000.m2ts" form a clip.

The playlist directory PLAYLIST includes playlist files (*.mpls), and each of the playlist files (*.mpls) includes at least one playitem designating a playing interval of a specific clip. The playitem has navigation information on a play starting time (In-Time) and play end time (Out-Time) of a particular clip desired to play, i.e., designated by the clip name given in a Clip_Information_File field in the playitem. Moreover, the playlist file *.mpls may be provided with a subplayitem as necessary, such as when data is to be played non-synchronized with the playitem.

In the BD directory BDMV, there are an index file index.bdmv and an object file MovieObject.bdmv as general files for securing user interactivity. The index file index.bdmv includes an index table index having main menu information and title information the user can select.

Particularly, the main menu information recorded in the index is called a main menu or a top menu. In relation to this, the subject disclosure introduces a popup menu, which is newly defined as new menu information separate from the main menu. A popup menu may provide detailed menu information according to the data attributes of a specific reproducing or playback unit (e.g., title, chapter, scene, etc.), and may be provided through a small window in the display that may overlap a currently reproduced picture in some cases.

Accordingly, the popup menu managing information is provided in each title. For example, a title may be divided into chapters each represented by one of a plurality of reproduction units, and popup menu information may be associated with each reproduction unit. Also, popup menu information may be provided as part of a playlist file (*.mpls), a clipinfo file (*.clpi), etc. Below, the main menu and the popup menu will be described in more detail referring to FIGS. 3A and 3B.

Figure 2:
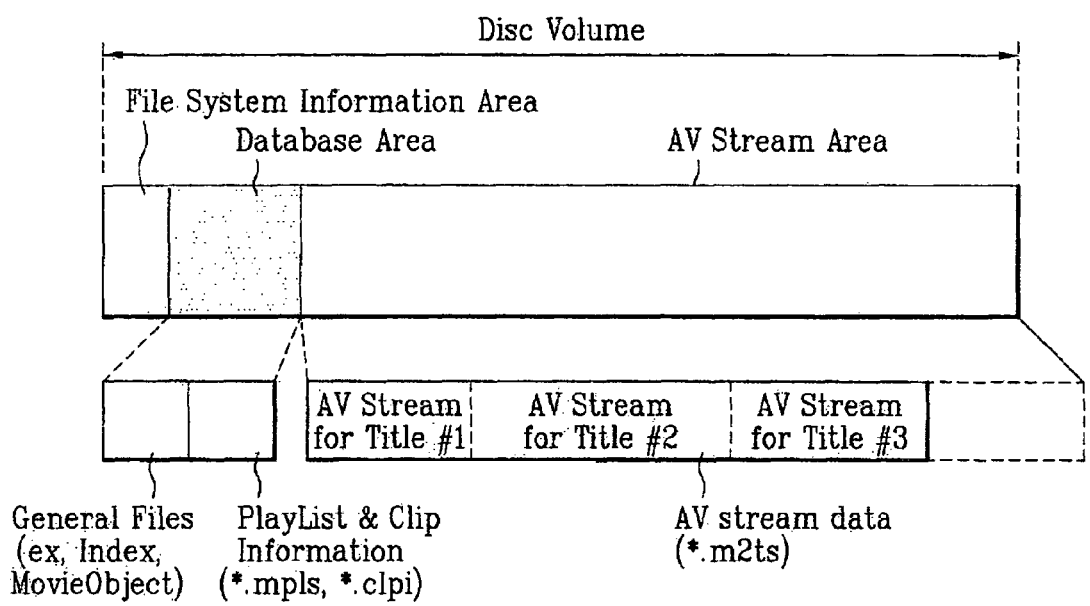
FIG. 2 schematically illustrates a disc volume for storing the file structure of FIG. 1 in accordance with an embodiment of the present invention.

As shown in FIG. 2, the disc volume of a BD-ROM is organized into a file system information area, a database area, and an A/V stream area. The file system information area stores system information for managing the disc. The database area includes a general files area and a playlist and clip information area. The general files area stores general files such as the index.bdmv file and the MovieObject.bdmv file. The playlist and clip information area stores the PLAYLIST directory and the CLIPINF directory. The main data and the supplementary data, such as audio/video/graphic, recorded thereon are stored as the MPEG2 transport stream formatted clip files (*.m2ts) in the A/V stream area.

Figure 3A:
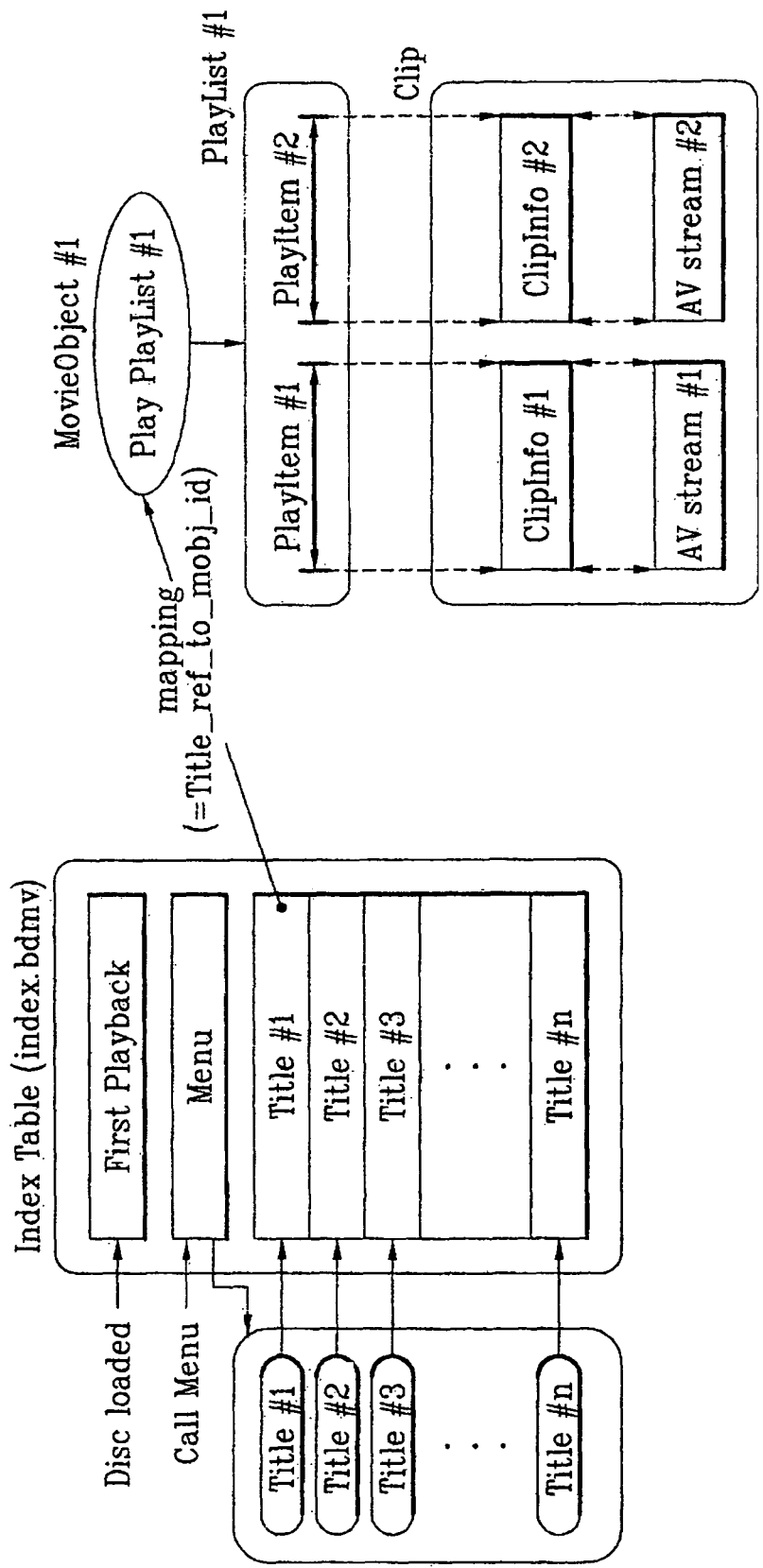

FIGS. 3A to 3B illustrate a data structure of the recording medium (e.g., BD-ROM) for managing graphic information such as a popup menu and a method for managing the menu information in accordance with an embodiment of the present invention. Specifically, FIG. 3A schematically illustrates the file structure provided by the main menu information in the index table, and FIG. 3B illustrates the data structure for managing popup menu information according to an embodiment of the present invention.

As shown in FIG. 3A, the file structure for managing the main menu includes the index file index.bdmv having main menu information. Specifically, the index file index.bdmv includes an Index Table having the main menu information Menu, title information Title #1, . . . , Title #n, and first playback information First Playback. The information in the index table is linked one-to-one with information in the corresponding object file MovieObject.bdmv, which controls reproduction.

Accordingly, the main menu information in the Index Table is performed by a user request "Call Menu", and in the main menu, a basic title menu is included. Thus, the user can select from the main menu, one of the titles the user wants to reproduce.

If the user selects Title #1, Title #1 is mapped to an object, e.g., MovieObject #1, designated by the link information, which is included in Title #1 information within the index table, i.e., 'Title_ref_to_mobj_id' information. And, a playlist, e.g., PlayList #1, designated by a command in the corresponding object is played back.

The playlist PlayList #1 is equipped with playitems PlayItem #1 and PlayItem #2 that include navigation information for reproducing Clips #1 and #2, respectively.

The first playback information First Playback in the index table Index Table includes link information that is automatically loaded when the disc is loaded. As such, the playlist file and clip file linked to the first playback information by an object in the MovieObject.bdmv file are reproduced, automatically, in the same manner as discussed above with respect to the Title #1.

In the process for reproducing a corresponding title, reproduction starts from the main menu. The main menu is limited to providing general, title based main menu information for the total disc, and there is a limitation in properly providing the main menu according to the attributes of the recorded data.

Owing in part to the above, when the data attributes of the recorded data are different and/or more detailed, separate additional menu information may be provided to the user so as to provide convenience and an environment different from the convention optical disc.

The additional menu information is graphic information called a popup menu. FIG. 3B illustrates the data structure for managing the graphic information forming popup menu information according to an embodiment of the present invention.

First of all, the popup menu is menu information separately provided according to the attributes of data recorded within each playback unit, whereas the main menu is general information provided for an overall disk. And, the 'specific playback unit' may be referred to as a 'scene' in FIG. 3B.

The present invention provides two types of popup menus. A first type will be referred to as a 'real-time popup menu' or 'first type popup menu (Type #1 PopUp menu)'. The second type will be referred to as a 'preloaded popup menu' or 'second type popup menu (Type #2 PopUp menu)'. Theses two types of popup menus will be described in greater detail below.

The 'scene' means the specific playback unit to which a disk author applies a popup menu. For instance, in accordance with the contents thereof, a title, chapter or the like may be one 'scene'.

Hence, there are various methods of distinguishing a scene in the file structure of FIG. 1. For instance, the scene may be distinguished using title information in the index file; using a playitem, a sub-playitem or playlist mark information in playlist, or using clip information in the clipinfo file. This will be explained in detail later.

In FIG. 3B, a plurality of scenes are provided for a specific title (e.g., Title #1) and a popup menu may be provided for each of the scenes. Specifically, the embodiments of the present invention enable providing different popup menus on a scene-by-scene basis, whereby the disk author can decide to provide a popup menu optimal to the attributes of data that will be recorded in the corresponding scene.

For instance, Scene #1 is provided with a real-time popup menu, and the corresponding popup menu includes a menu enabling shopping and a language menu enabling a change of an audio language. Scene #2 is provided with a preloaded popup menu, and the corresponding popup menu includes a menu for a chapter change and a comment menu having enhanced data. And, Scene #3 is not provided with a popup menu.

Moreover, each popup menu is additionally equipped with a menu selection for executing the main menu in the index table. If the corresponding 'main menu' in the popup menu is clicked, the 'Call Menu' command is executed so that the main menu of the index file is executed.

Contrary to how the main menu is displayed, the popup menu is displayed overlapping, using a small window, a presently reproduced picture without changing the presently reproduced picture. As such, the presently reproduced picture becomes the background picture. The background picture may be a stilled or paused picture, or may be continuously reproduced without being paused.

The execution of the main or popup menu is based on a user's execution command, e.g., a menu execution button input via a remote controller. In case of the popup menu, various execution commands may be implemented. For instance, for a real-time popup menu, an execution icon displaying that a popup menu exists in a current playback section within a currently displayed image is provided to a user. The user then clicks the corresponding icon to execute the popup menu. In case of the preloaded popup menu, a menu execution button input is made via a remote controller to execute the popup menu. These operations will be explained in detail below with respect to FIGS. 4 and 5.

In summing up the features of the newly defined popup menu, the popup menu provides menu information based on the data attributes within a specific playback unit. There may exist a plurality of popup menu types, and the disk author selectively determines the popup menu types. Each of the execution commands PopUp_on of the popup menus is separately configured per each popup menu type. The operation of the popup menu is performed while having the background image paused or by maintaining play back of the background image without switching the background image as when the main menu is executed.

The above-configured menu information, and particularly, the configuration per each type of the popup menu and various executing methods thereof are explained by referring to the detailed embodiments of the present invention below.

FIGS. 4, 6A-6C and 6E illustrate embodiments for managing a real time popup menu according to the present invention, and FIGS. 5, 6A-6B and 6D-6E illustrate embodiments for managing a preloaded popup menu according to the present invention.

First, differences between the real-time popup menu and the preloaded popup menu in these embodiments will be described.

Firstly, in configuring popup menu data, the first type popup menu (real-time popup menu) means a popup menu provided by being multiplexed with the associated AV data and provided on a real time basis. The second type popup menu (preloaded popup menu) means a popup menu provided by a separate popup menu data file, distinguished from the associated AV data file, that is preloaded by a playback apparatus.

Hence, the first type popup menu and the second type popup menu are named 'real-time popup menu' and 'preloaded popup menu', respectively. The real-time popup menu and the preloaded popup menu are occasionally named 'dyna-view popup menu' and 'on-demand popup menu', respectively.

Secondly, for popup menu execution, a selection of a specific popup menu button provided on an external remote controller and the like or an input panel is recognized as the execution command Popup_on. On the contrary, the real-time popup menu is always provided within a played-back image in the form of a specific execution icon, and a reproducing apparatus recognizes a user clicking the corresponding icon as the execution command PopUp_on. Hence, the preloaded popup menu is occasionally referred to as a user request popup menu and the real-time popup menu is occasionally referred to as an always on display popup menu.

A disk author sets up the most efficient popup menu to provide a user based on the attributes of the recorded data. Hence, the popup menu may not be provided for a specific playback unit (e.g., Scene #3 in FIG. 3B) or both of the first and second type popup menus may be provided.

Figure 4:
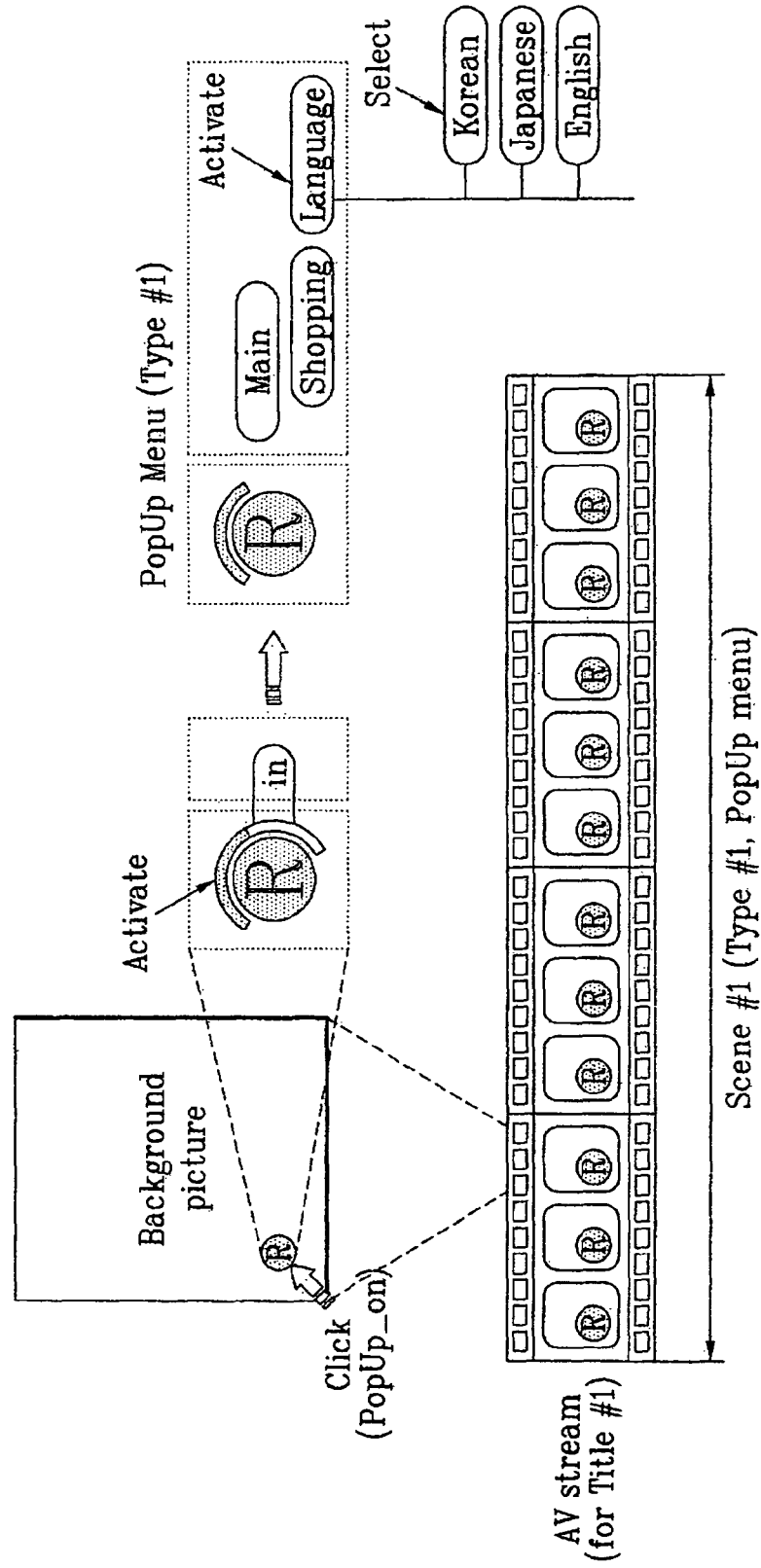
FIG. 4 illustrates an embodiment for managing a real time popup menu according to the present invention.

FIG. 4 schematically illustrates the configuration and execution of a real-time popup menu. As shown, a user-recognizable execution icon (e.g., a circled 'R' icon) is provided to one side of each playback image (e.g., always on display). If a user clicks the corresponding icon ('Pop-Up_on'), the corresponding menu information is provided.

For instance, if the real-time popup menu is the same as applied to Scene #1 of FIG. 3B, the activated popup menu includes the menu selections of 'Shopping', 'Language' and 'Main' menu as discussed above. If a user selects the 'Language' menu, another menu of sub-selections such as 'Korean', 'Japanese', 'English', and the like is provided. If the user further selects 'Korean' from the sub-menu, the language used in playing back the optical disk is set to Korean.

Moreover, if 'Main' menu is selected (which becomes the 'Call_Menu' command), a current image is switched to a main menu image for execution by the index file.

Hence, in the actual implementation of the real-time popup menu according to the embodiment of the present invention, the identical popup menu can be configured within the corresponding playback unit (e.g., Scene #1 in FIG. 4). As will be appreciated, the playback unit (e.g., Scene #1) may be divided into time-based playback sections, and real-time popup menus having different menu information may be provided for each of the divided sections.

Figure 5:
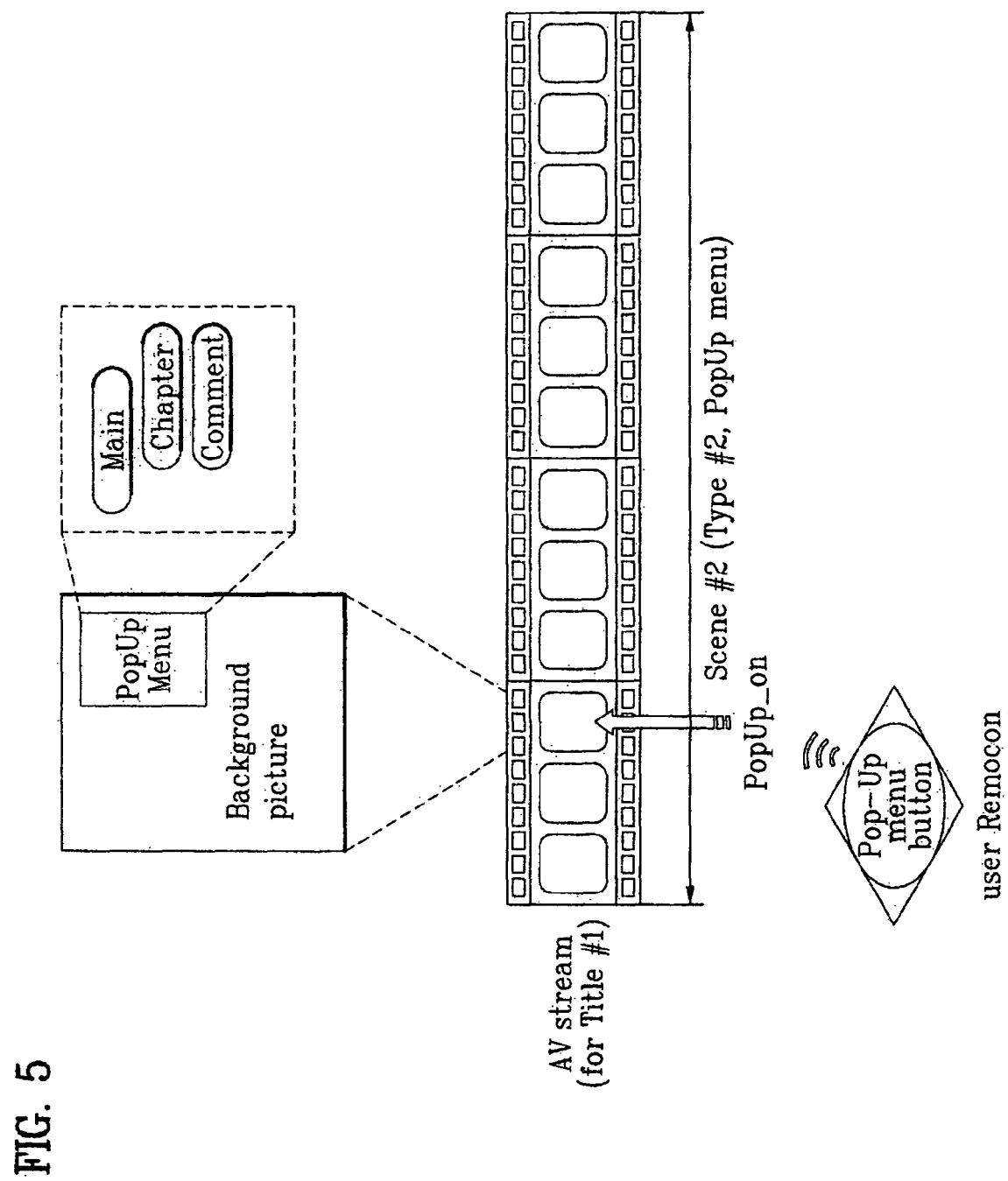
FIG. 5 illustrates an embodiment for managing a preloaded popup menu according to the present invention.

FIG. 5 schematically illustrates the configuration and execution method of the preloaded popup menu. Here, the corresponding menu information is provided if a user selects a popup menu execution button using an external remote controller or the like (PopUp_on). For instance, unlike the real-time popup menu, which includes an always on display component, the preloaded popup menu is usually not displayed until a user request is received.

If the preloaded popup menu of FIG. 5 is the same as the preloaded popup menu applied to Scene #2 of FIG. 3B, the execution command PopUp_on of the popup menu activates display of a popup menu consisting of 'Main' menu, 'Chapter' menu, and 'Comment' menu selections. The chapter menu provides for enabling a chapter change. The comment menu provides for enhanced data. A user then selects one of the menus to call up the selected menu. Moreover, if the 'Main' menu is selected (Call_Menu), a current image is switched to a main menu image as discussed previously.

Hence, in the actual implementation of the preloaded popup menu according to the embodiment of the present invention, the popup menu can be configured within the corresponding playback unit (e.g., Scene #2). As mentioned in the foregoing description, the preloaded popup menu is managed as a menu file separate from the general AV data.

Therefore, both of the real-time and preloaded popup menus may be simultaneously utilized in some implementations of the present invention. For instance, assuming that Scene #2 is one chapter, the second type (preloaded) popup menu is utilized as a popup menu in common with the corresponding chapter and the first type (real-time) popup menu may be utilized as a popup menu for varying by real time within the corresponding chapter. In this case, Scene #2 will be the example where both of the first and second types of popup menus are applied.

With classifying the popup menus of the present invention into two types and using a specific popup menu type, a data structure for identifying the type of the popup menu in a specific file information per playback unit is provided. Moreover, the present invention provides for distinguishing one case where the popup menu is not applied to a specific playback unit from the other case where both of the popup menus of the two types are applied to the specific playback unit. The data structure for, and method of recording, the identification information for identifying the popup menu type is explained in detail as follows.

FIGS. 6A to 6E illustrates data structures of the management and identification information, identifying a popup menu type, according to embodiments of the present invention.

Figure 6A:
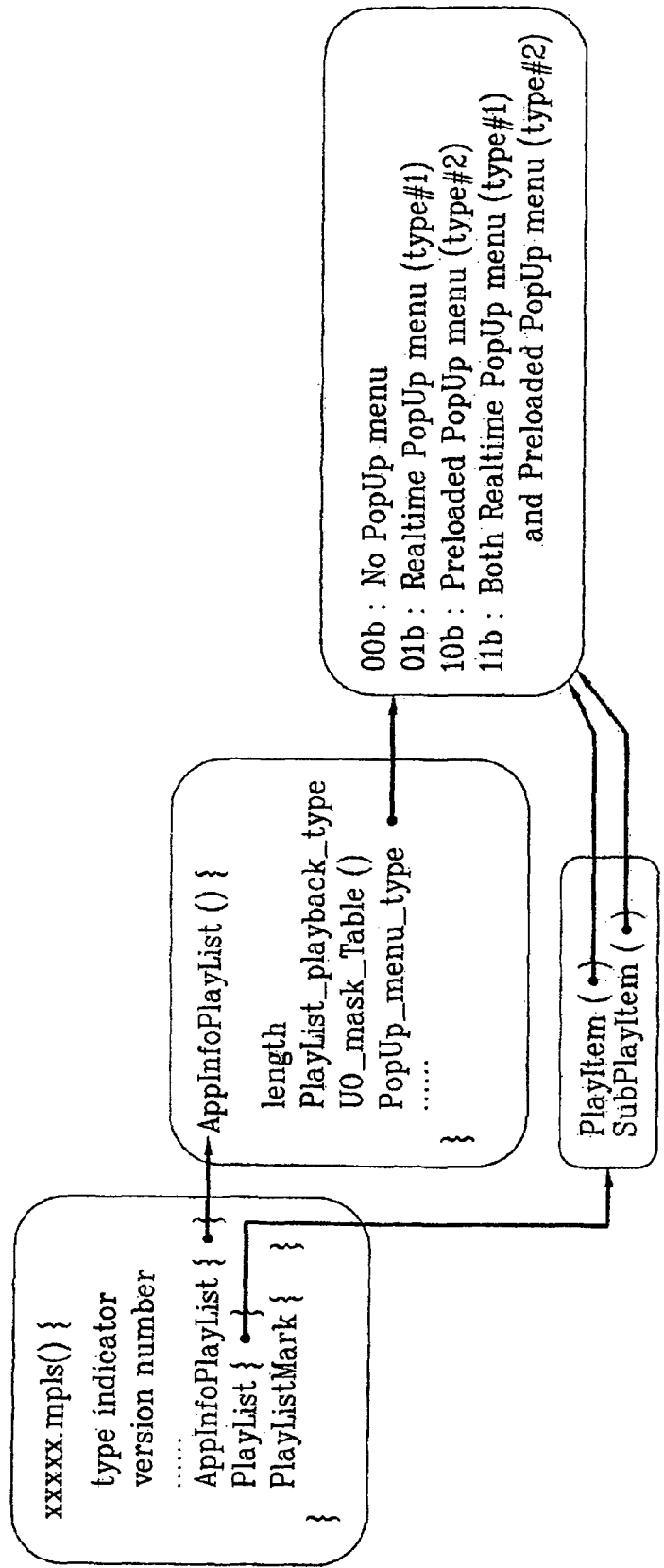
FIGS. 6A to 6E illustrates data structures of the management and identification information according to embodiments of the present invention.

FIG. 6A illustrates an embodiment of recording popup menu identification information in a playlist file. Referring to FIG. 6A, in the playlist file, there exists a 'AppInfoPlayList { }' data structure recording application information, a 'PlayList { }' data structure recording playitem and sub-playitem information, and a 'PlayListMark { }' data structure recording mark information.

The popup menu type identification information of this embodiment of the present invention is named 'PopUp_menu_type' as a field name and is recorded in the playlist file. 'PopUp_menu_type=00b' means that a popup menu fails to support a corresponding playback unit. 'PopUp_menu_type=01b' means that only a real-time popup menu supports a corresponding playback unit. 'PopUp_menu_type=10b' means that only a preloaded popup menu supports a corresponding playback unit. And, 'PopUp_menu_type=11b' means that a real-time popup menu and a preloaded popup menu support a corresponding playback unit.

The field 'PopUp_menu_type' may be set for each playback unit (e.g., a scene) or for a specific playback section within a playback unit. For instance, the indicator 'PopUp_menu_type' may be defined in the 'AppInfoPlayList { }', 'PlayItem 0' or 'SubPlayItem 0' data structures. Moreover, the name of the supported popup menu may be directly included in the file information managing the playback unit supported by the popup menu.

FIGS. 6B to 6E show the file structures recorded per 'PopUp_menu_type', and illustrate cases of 'PopUp_menu_type=00b (No PopUp menu)', 'PopUp_menu_type=01b (type #1 PopUp menu)', 'PopUp_menu_type=10b (type #2 PopUp menu)', and 'PopUp_menu_type=11b (type #1 & type #2 PopUp menu)', respectively.

Figure 6B:
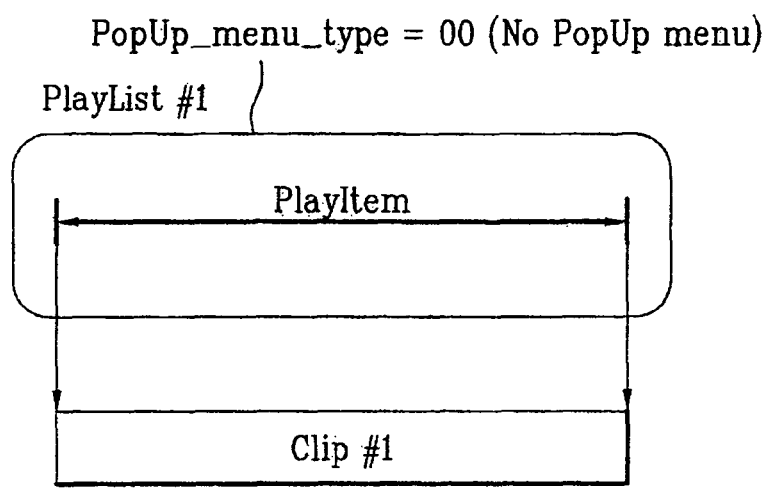

FIG. 6B shows the case of 'PopUp_menu_type=00b (No PopUp menu)' where a popup menu fails to exist for a specific playback unit. As shown, PlayList #1 includes a playitem having navigation information for reproducing Clip #1. The Clip #1 has an AV stream recorded therein. A control unit of an optical recording/reproducing apparatus (e.g., control unit 12 of the optical recording/reproducing apparatus in FIG. 7 discussed in detail below) recognizes that there is no popup menu in the corresponding playback unit if 'PopUp_menu_type=00b' for the corresponding PlayList #1. If a user's popup menu execution command (PopUp_on) is delivered, the control unit delivers an announcement message via a display screen, for example, announcing that there is no popup menu. This will be explained in detail with respect to FIG. 8 below.

Figure 6C:
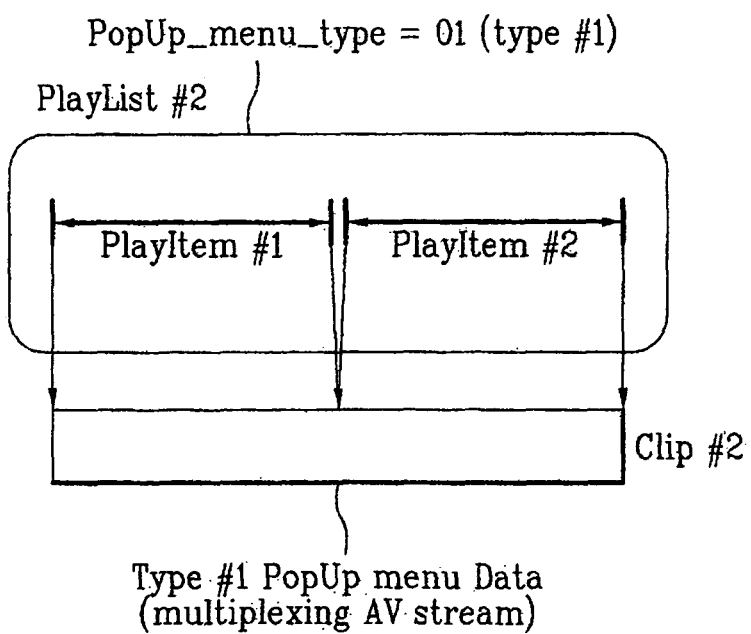

Referring to FIG. 6C, shown is the case of 'PopUp_menu_type=01b' where a first type (real-time) popup menu exists within a specific playback unit. For instance, PlayList #2 includes first and second playitems PlayItem #1 and PlayItem #2 for managing reproduction of a Clip #2. The Clip #2 is recorded by multiplexing the graphic information representing the first type (real-time) popup menu and an AV stream into MPEG2 transport packets.

Figure 7:
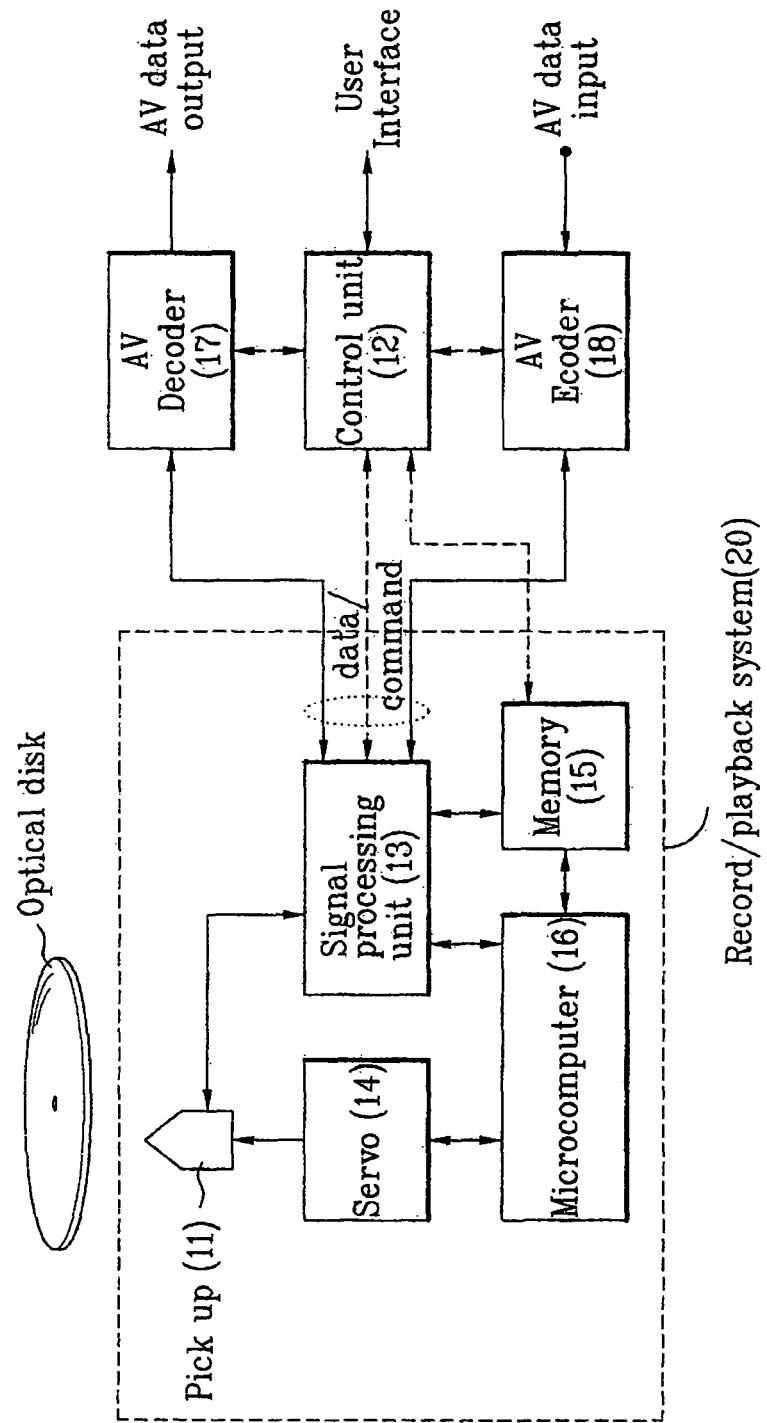
FIG. 7 illustrates an example embodiment of an optical recording/reproducing apparatus according to the present invention.

Here, the control unit of an optical recording/reproducing apparatus such as in FIG. 7 uses the PID (packet ID) of the real-time popup menu packets, which differ from the PID of the AV data packets, to filter out real-time popup menu packets and provide the corresponding popup menu. As will be appreciated based on the description of FIG. 4, the real-time menu is always on display.

If a user's menu execution command (PopUp_on) for a second type popup menu is delivered, the control unit delivers an announcement message announcing that the second type popup menu is not supported. As discussed above, this operation will be described in detail with respect to FIG. 8.

Figure 6D:
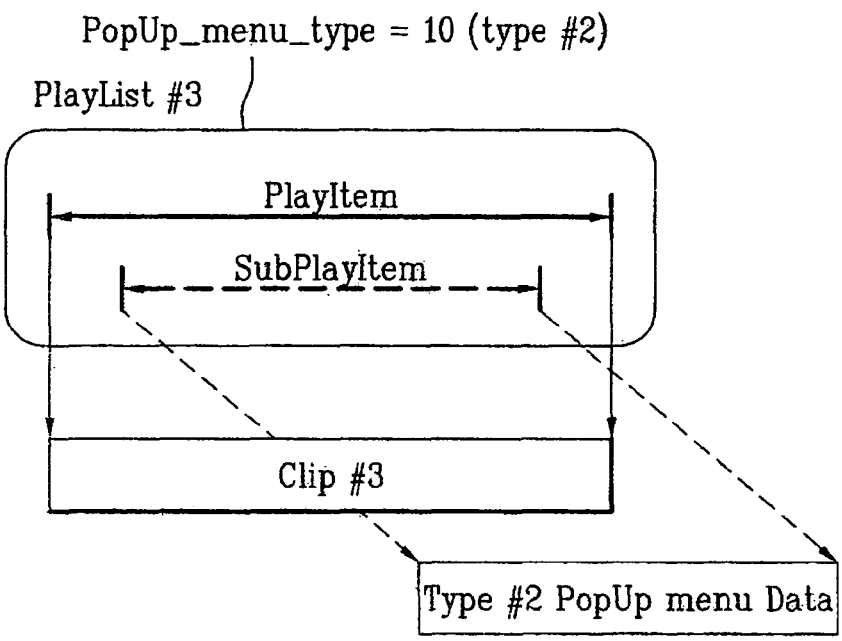

FIG. 6D illustrates the case of 'PopUp_menu_type=10b' where the second type (preloaded) popup menu exists for a specific playback unit. Referring to FIG. 6D, a PlayList #3 includes a playitem having navigation information for reproducing a Clip #3, which has AV stream data recorded therein.

The PlayList #3 also includes a subplayitem having navigation information for reproducing a separate file of the graphic information representing a second type popup menu.

Recognizing 'PopUp_menu_type=10b' from the corresponding PlayList #3, the control unit of an optical recording/reproducing apparatus (e.g., control unit 12 of the optical recording/reproducing apparatus in FIG. 7 discussed in detail below) firstly plays back the second type (preloaded) popup menu data based on the navigation information provided by the subplayitem, before playing back Clip #3, and loads the preloaded popup menu into memory. Once an execution command PopUp_on for activating the preloaded popup menu is received from a user, the preloaded second type popup menu is provided (e.g., output for display). Additionally, or alternatively, the optical recording/reproducing apparatus of FIG. 7 may provide a recognition icon for display in an particular area of a display screen so that the user recognizes that the second type popup menu exists. This will be explained in detail below by referring to FIG. 8.

Figure 6E:
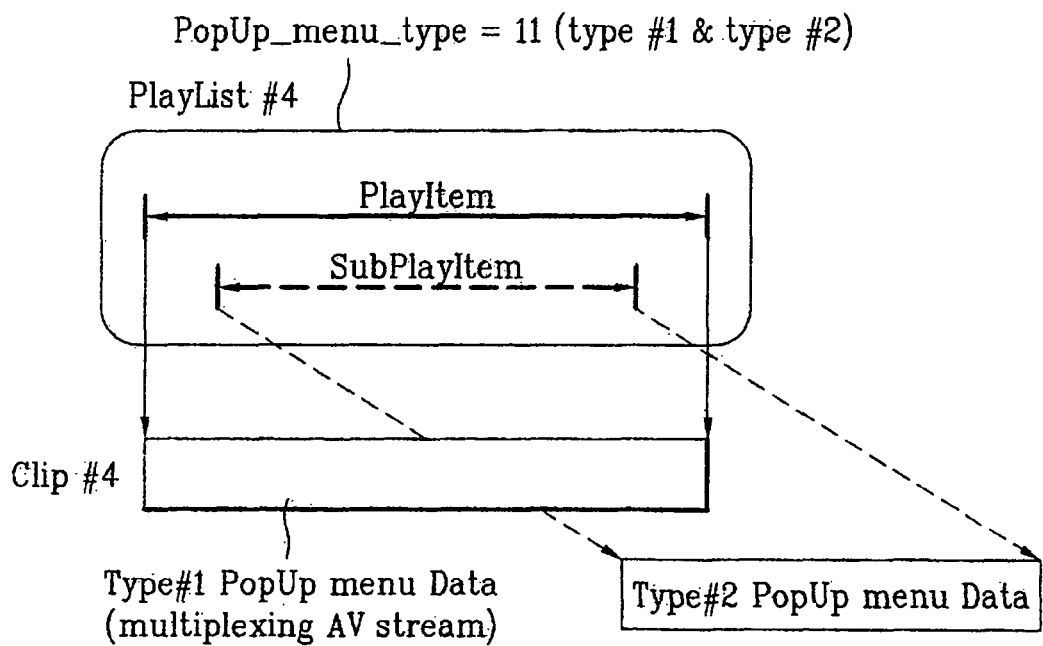

FIG. 6E illustrates the case of 'PopUp_menu_type=11b' where both of the first and second types (real-time and preloaded) of popup menus exist for a specific playback unit. Referring to FIG. 6D, a PlayList #4 includes a playitem having navigation information for managing reproduction of a Clip #4. The Clip #4 has MPEG2 transport packets of the first type popup menu and AV stream multiplexed together. The PlayList #4 also includes a subplayitem having navigation information for reproducing a separate file of the graphic information representing a second type popup menu.

Recognizing 'PopUp_menu_type=11b' from the corresponding PlayList #4, the control unit of an optical recording/reproducing apparatus (e.g., control unit 12 of the optical recording/reproducing apparatus in FIG. 7 discussed in detail below) firstly plays back the second type (preloaded) popup menu data based on the navigation information provided by the subplayitem, before playing back Clip #4, and loads the preloaded popup menu into memory. Once an execution command PopUp_on for activating the preloaded popup menu is received from a user, the preloaded second type popup menu is provided (e.g., output for display). Additionally, or alternatively, the optical recording/reproducing apparatus of FIG. 7 may provide a recognition icon for display in an particular area of a display screen so that the user recognizes that the second type popup menu exists. This will be explained in detail below by referring to FIG. 8.

Moreover, the control unit reads out the multiplexed first type popup menu within Clip #4 by means of PID (packet ID) filtering as discussed above. Once the user's first type popup menu execution command PopUp_on is delivered, the real-time type popup menu is provided. Namely, if a user's first type (real-time) popup menu execution command (PopUp_on) is delivered, the control unit provides the first type popup menu read out by PID (packet ID) filtering.

FIG. 7 illustrates an example embodiment of an optical recording/reproducing apparatus according to the present invention. As shown, the apparatus includes a pickup member 11 for retrieving or recording managing information having data and menu information recorded in the optical disc; a servo or driver 14 for controlling movement of the pickup member 11; a signal processor 13 for demodulating a reproduced signal received from the pickup member 11 into a desired signal value or modulating the signal to be recorded into a signal recorded in the optical disc; a memory 15 for temporarily storing the managing information having the menu information, and a microcomputer 16 for controlling the servo 14, the signal processor 13 and the memory 15. A comprehensive term of above structural elements is a record playback system 20. Particularly, the record playback system 20 performs reproduction based on the data structure as described above with respect to FIGS. 1-6E.

An AV decoder 17 provides the data to the user by decoding output data according to instruction from a controller 12. The AV encoder 17 converts an input signal into a specific format (i.e., MPEG2 transport stream) according to the control of the controller 12, and provides the converted signal to the signal processor 13 in the record playback system 20 for performing the function of recoding the signal to the optical disc.

From the reproduced popup menu type identification information (PopUp_meu_type) recorded on the recording medium, the control unit 12 recognizes whether each specific playback unit is supported by a popup menu and the type or types of popup menu supporting the playback unit. The control unit 12 reads out popup menu data per the recognized type according to a previously defined method such as described with respect to FIGS. 6A to 6E, and then provides the corresponding popup menu to a user if a user's popup menu execution command (PopUp_on) is delivered.

Specifically, when receiving the user's popup menu execution command (PopUp_on), the control unit 12 performs the popup menu execution command (PopUp_on) corresponding to the read-out identification information and may provide an announcement message to a user in response to a popup menu execution command (PopUp_on). This operation is explained in detail by referring to FIG. 8.

Figure 8:
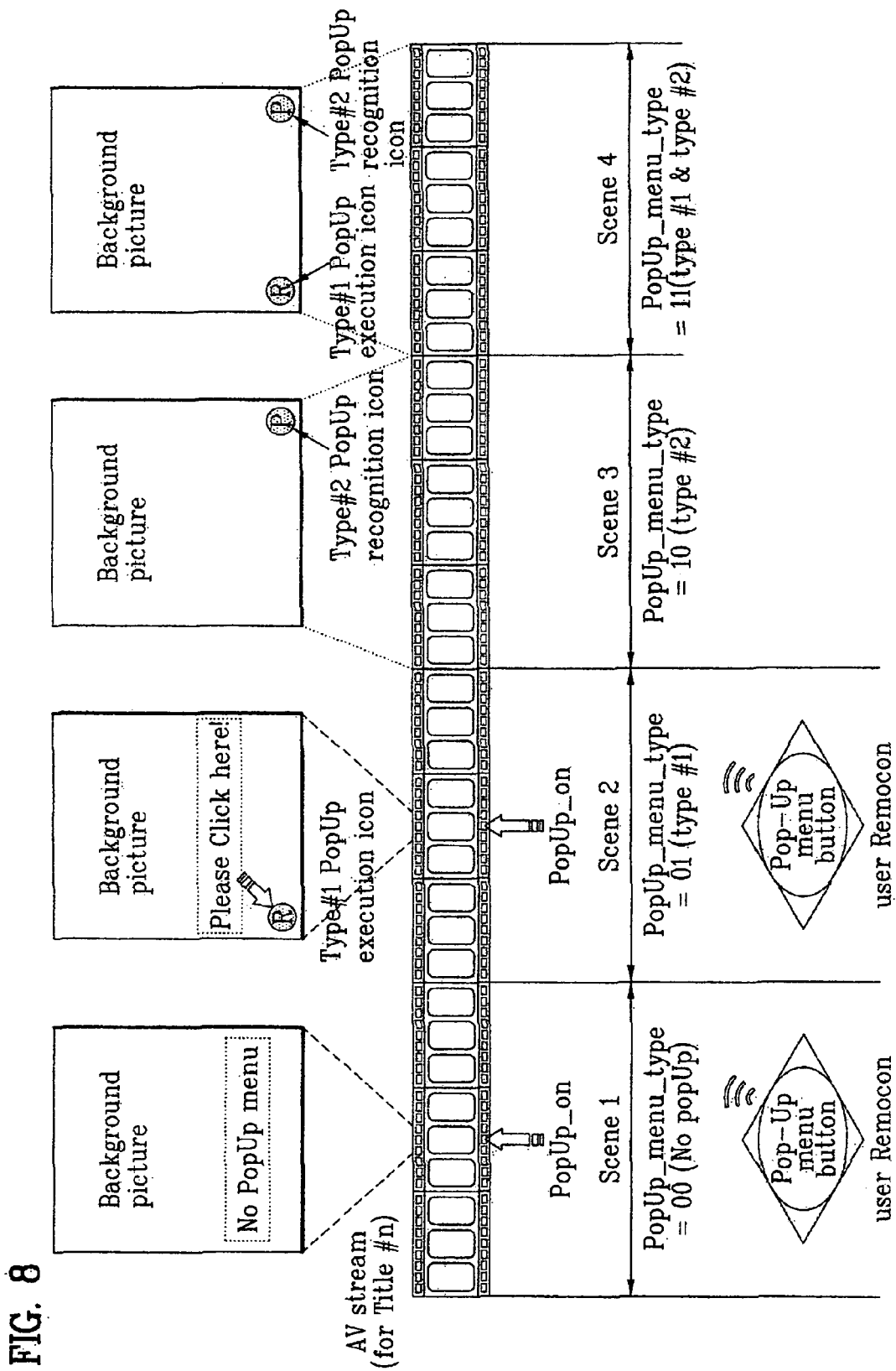
FIG. 8 illustrates an optical disk having a specific title (Title #n) divided into four scenes to which popup menus may be applied.

FIG. 8 is a diagram illustrating the operation of the optical recording/reproducing apparatus after popup menu type identification information (PopUp_menu_type) per specific playback unit in a disk has been recognized.

FIG. 8 illustrates an optical disk having a specific title (Title #n) divided into four scenes to which popup menus may be applied. An optical recording/reproducing apparatus such as in FIG. 7 recognizes a popup menu type for each scene from the popup menu identification information PopUp_menu_type recorded in the disk in association with each scene. Based on the type indication information, the apparatus decides what operations of reading out and supporting popup menu data to perform based on interaction with a user.

When playing back Scene #1, which is not supported by a popup menu (Popup_menu_type=00b), if a second type popup menu execution command PopUp_on (menu button of a remote controller) is delivered from a user, the apparatus provides a message for display that informs the user that the popup menu fails to exist. The user has to click an execution icon displayed on the screen to execute the first type popup menu. Yet, Scene #1 fails to be supported by the first type popup menu so that the execution icon itself fails to be displayed on the screen. Hence, the second type popup menu execution command is taken into consideration only since the first type popup menu execution command PopUp_on can not be received from the user.

Scene #2 has 'PopUp_menu_type=01b' indicating that this playback unit is supported by the first type popup menu only. A first type popup menu execution icon (e.g., circled 'R') is always displayed on one side of a playback image while the corresponding section is played back. If a user clicks the corresponding execution icon, the apparatus recognizes this as the first type popup menu execution command PopUp_on and the apparatus provides the popup menu. If the second type popup menu execution command PopUp_on is received from the user, the apparatus provides a message for display informing the user that there exists no second type popup menu. The apparatus may further provide an announcement message leading to the execution of the real-time popup menu. For instance, the message asks the user to click the real-time popup menu execution icon with a message of 'Please Click here!'.

With respect to Scene #1 or Scene #2, either fails to be supported by the second type popup menu. Yet, the user may frequently demand the execution of the popup menu button using a remote controller and the like unintentionally (which corresponds to the execution command PopUp_on of the second type popup menu). Hence, the above methods will be very useful in alerting the user.

Scene #3 has 'PopUp_menu_type=10b' indicating that Scene #3 is supported by a preloaded popup menu only. If a preloaded type popup menu execution command PopUp_on is delivered from a user in the process of playing back the corresponding section, the popup menu which is preloaded will be provided. Moreover, the optical recording/reproducing playback apparatus in one embodiment may provide a recognition icon (e.g., circled 'P') on one side of a provided image if there exists the preloaded popup menu, thereby informing the user that the preloaded popup menu is supportable in the current playback section. As with Scene #1, Scene #3 fails to be supported by a real-time popup menu so that the real-time popup menu execution icon fails to be displayed thereon. Hence, the real-time popup menu execution command PopUp_on will not be delivered from the user.

Scene #4 has 'PopUp_menu_type=11b' indicating that Scene #4 is supported by both a preloaded popup menu and a real-time popup menu. As such, the apparatus is able to provide a popup menu corresponding to each type of user popup menu execution command PopUp_on while the corresponding section is played back. As described above with respect to Scene #3, a recognition icon enabling the user to recognize that the preloaded popup menu exists may be provided on one side of the screen. In case that the real-time popup menu is supported, the real-time popup menu execution icon will always be displayed on the screen. Hence, it is apparent that a separate real-time popup menu execution indicator will be necessary in this optional embodiment.

In the embodiments described above, the multiplexed or real-time popup menu was described as the always on display menu. Namely, a component of the real-time popup menu is always on display. However, the present invention is not limited to the real-time menu being the popup menu for always on display. Instead, the preloaded popup menu may serve as the menu for always on display.

Similarly, in the embodiment described above, the non-multiplexed or preloaded popup menu was mostly described as a menu that was not displayed until user input requesting display of the menu was received. However, it will be appreciated that the multiplexed or real-time popup menu may serve as a user request menu in which no display takes place until user input requesting display of the menu is received.

To the extent that one type of menu serves as an always on display menu and another type of menu serves as a user request display menu, the type indication information indicates whether a menu is an always on or user request menu.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A non-transitory computer-readable medium having a data structure for managing menu information, comprising:
    a recording area storing a main video stream, ~a graphic stream and playlist file, the graphic stream including menu information and an indicator associated with the menu information, the indicator being configured to indicate a menu display type of the menu information with respect to user request, the menu information including one of a first type of menu information and a second type of menu information, the playlist file including navigation information for reproducing at least one of the main video stream and the graphic stream,
    wherein the indicator is configured to indicate whether the menu display type is a first display type of menu information or a second display type of menu information,
    if the indicator indicates the second display type of menu information, the second type menu information is not displayed on a screen until a user request is activated during a playback of the medium, and
    if the indicator indicates the first display type of menu information, a menu object associated with the first type menu information is continuously displayed on the screen without user request during a playback of the medium, and
    the first type of menu information and the main video stream are multiplexed in the recording area, and the second type of menu information is stored in the graphic stream separate from the main video stream, and
    the playlist file includes a playitem and a subplayitem, the playitem including navigation information for reproducing the first type of menu information, the subplayitem including navigation information for reproducing the second type of menu information.

2. A non-transitory computer-readable medium of claim 1, wherein the menu information is graphic data.

3. A method of reproducing menu information from a recording medium, comprising:
    reading a main video stream, a graphic stream and playlist, the graphic stream including menu information and an indicator associated with the menu information from the recording medium, the indicator being configured to indicate menu display type of the menu information with respect to user request, the menu information including one of a first type of menu information and a second type of menu information, the indicator being configured to indicate whether the menu display type is a first display type of menu information or a second display type of menu information, the second type of menu information being separated from the first type of menu information, the playlist file including navigation information for reproducing at least one of the main video stream and the graphic stream; and
    reproducing the menu information according to the indicator and the playlist;
    wherein if the indicator indicates the first display type of menu information, a menu object associated with the first type menu information is continuously displayed on a screen without user request during a playback of the medium and if the indicator indicates the second display type of menu information, the second type menu information is not displayed on the screen until a user request is activated during a playback of the medium, and
    the first type of menu information and the main video stream are multiplexed on the recording medium, and the second type of menu information is stored in the graphic stream separate from the main video stream, and the playlist file includes a playitem and a subplayitem, the playitem including navigation information for reproducing the first type of menu information, the subplayitem including navigation information for reproducing the second type of menu information.

4. A method of recording a data structure for managing reproduction of menu information on a recording medium, comprising:

recording a main video stream a graphic stream and a playlist file, the graphic stream including menu information and an indicator associated with the menu information on the recording medium, the indicator being configured to indicate menu display type with respect to user request, the menu information including one of a first type of menu information and a second type of menu information, the playlist file including navigation information for reproducing at least one of the main video stream and the graphic stream, wherein the indicator is configured to indicate whether the menu display type is a first display type of menu information or a second display type of menu information, such that if the indicator indicates the second display type of menu information, the second type menu information is not displayed on a screen until a user request is activated during a playback of the medium, and if the indicator indicates the first display type of menu information, a menu object associated with the first type menu information is continuously displayed on the screen without user request during a playback of the medium, and the first type of menu information and the main video stream are multiplexed on the recording medium, and the second type of menu information is stored in the graphic stream separate from the main video stream, and the playlist file includes a playitem and a subplayitem, the playitem including navigation information for reproducing the first type of menu information, the subplayitem including navigation information for reproducing the second type of menu information.

5. An apparatus for reproducing menu information from a recording medium, comprising:

a reproducing unit configured to read a main video stream a graphic stream and a playlist file from the recording medium, the graphic stream including the menu information and an indicator, the indicator being configured to indicate a menu display type with respect to user request, the menu information including one of a first type of menu information and a second type of menu information, the second type of menu information being separated from the first type of menu information, the playlist file including navigation information for reproducing at least one of the main video stream and the graphic stream, and a controller configured to control the reproducing unit to reproduce the indicator and reproduce one of the first and second type of menu information according to the indicator and the playlist file;

wherein the indicator is configured to indicate whether the menu display type is a first display type of menu information or a second display type of menu information, such that if the indicator indicates the second display type of menu information, the second type menu information is not displayed on a screen until a user request is activated during a playback of the medium, and if the indicator indicates the first display type of menu information, a menu object associated with the first type menu information is continuously displayed on the screen without user request during a playback of the medium, and the first type of menu information and the main video stream are multiplexed on the recording medium, and the second type of menu information is stored in the graphic stream separate from the main video stream, and the playlist file includes a playitem and a subplayitem, the playitem including navigation information for reproducing the first type of menu information, the subplayitem including navigation information for reproducing the second type of menu information.

6. An apparatus for recording a data structure for managing reproduction of menu information, comprising:

a recording unit configured to record a main video stream, a graphic stream and a playlist file on the recording medium, the graphic stream including menu information and an indicator associated with the menu information, the indicator being configured to indicate a menu display type with respect to user request, the menu information including one of a first type of menu information and a second type of menu information, the second type of information being separated from the first type of menu information, the playlist file including navigation information for reproducing at least one of the main video stream and the graphic stream; and a controller configured to control the recording unit to record the menu information and the indicator to indicate the menu display type of the menu information, wherein the indicator is configured to indicate whether the menu display type is a first display type of menu information or a second display type of menu information, such that if the indicator indicates the second display type of menu information, the second type menu information is not displayed on a screen until a user request is activated during a playback of the medium, and if the indicator indicates the first display type of menu information, a menu object associated with the first type menu information is continuously displayed on the screen without user request during a playback of the medium, and the first type of menu information and the main video stream are multiplexed on the recording medium, and the second type of menu information is stored in the graphic stream separate from the main video stream, and the playlist file includes a playitem and a subplayitem, the playitem including navigation information for reproducing the first type of menu information, the subplayitem including navigation information for reproducing the second type of menu information.

7. The apparatus of claim 5, wherein display of first type of menu information is not removed by user request.

8. The apparatus of claim 5, wherein the reproducing unit is configured to reproduce data from the recording medium according to a reproduction command transmitted from the controller.

9. The apparatus of claim 6, wherein the recording unit is configured to record data on the recording medium according to a record command transmitted from the controller.

10. A non-transitory computer-readable medium of claim 1, wherein the second type of menu information is information of a preloaded popup menu and the first type of menu information is information of a menu that is always on.

* * * * *